(12) United States Patent  
Bennett

(10) Patent No.: US 8,745,704 B2  
(45) Date of Patent: Jun. 3, 2014

(54) POWERLINE COMMUNICATION DEVICE SUPPORTING SECURE DATA EXCHANGE

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/324,084

(22) Filed: Dec. 13, 2011

(65) Prior Publication Data

US 2013/0007855 A1 Jan. 3, 2013

Related U.S. Application Data

(60) Provisional application No. 61/503,060, filed on Jun. 30, 2011.

(51) Int. Cl.
*H04L 9/32* (2006.01)

(52) U.S. Cl.
USPC .............................. 726/5; 370/310; 455/552.1

(58) Field of Classification Search
USPC ........ 726/5; 455/552; 370/310, 522; 340/310
See application file for complete search history.

(56) References Cited

U.S. PATENT DOCUMENTS

| | | | |
|---|---|---|---|
| 2005/0085259 A1* | 4/2005 | Conner et al. | 455/552.1 |
| 2005/0136972 A1 | 6/2005 | Smith | |
| 2005/0278319 A1* | 12/2005 | Karklins et al. | 707/3 |
| 2008/0143491 A1* | 6/2008 | Deaver | 340/310.11 |

FOREIGN PATENT DOCUMENTS

| | | |
|---|---|---|
| CN | 101447999 | 6/2009 |
| CN | 101860495 | 10/2010 |

OTHER PUBLICATIONS

European Patent Office; European Search Report; EP Application No. 12004823.6; Nov. 2, 2012; 6 pgs.

* cited by examiner

*Primary Examiner* — Jeffrey Pwu  
*Assistant Examiner* — Samuel Ambaye  
(74) *Attorney, Agent, or Firm* — Garlick & Markison; Bruce E. Stuckman

(57) ABSTRACT

A Power Line Communications (PLC) device includes a processing module, memory, a Wireless Local Area Network interface (WLAN I/F), and a PLC communication interface (PLC I/F). When operating as a client device, the PLC device establishes communications with a premises communication device via the PLC I/F, requests WLAN service from the premises communication device via the PLC I/F, receives WLAN access credentials from the premises communication device via the PLC I/F, and accesses a WLAN via the WLAN I/F using the WLAN access credentials. The PLC device communicates with a client device via the PLC I/F, receives a WLAN service request from the client device via the PLC I/F, validates the client device for WLAN service, and transmits WLAN access credentials to the client device via the PLC I/F. The PLC device may also support backchannel operations such as financial transactions, key exchanges, encryption support, all via the PLC I/F.

19 Claims, 10 Drawing Sheets

POWERLINE COMMUNICATION DEVICE SUPPORTING SECURE DATA EXCHANGE

CROSS-REFERENCE TO PRIORITY APPLICATION

The present U.S. Utility Patent Application claims priority pursuant to 35 U.S.C. §119(e) to U.S. Provisional Application Ser. No. 61/503,060 filed Jun. 30, 2011, which is hereby incorporated herein by reference in its entirety and made part of the present U.S. Utility Patent Application for all purposes.

BACKGROUND OF THE INVENTION

1. Field of the Invention

The present invention relates to powerline communications and in particular, powerline communication devices, and systems of use therefore.

2. Description of the Related Art

Communication systems are well known and include Local Area Networks (LANs), Wide Area Networks (WANs), cellular networks, Wireless Local Area Networks (WLANs), Wireless Wide Area Networks (WWANs), Personal Area Networks (PANs), etc. With the growing need for the exchange of digital content (e.g. MP3 audio, MPEG4 video and digital photographs) there is a widely recognized need to improve digital communication systems. Powerline communication (PLC) is a technology that encodes data in a signal and transmits the signal on existing electricity powerlines in a band of frequencies that are not used for supplying electricity. Accordingly, PLC leverages the ubiquity of existing electricity networks to provide extensive network coverage. Furthermore, since PLC enables data to be accessed from conventional power-outlets, no new wiring needs to be installed in a building (or different parts of a building). Accordingly, PLC offers the additional advantage of reduced installation costs.

In some buildings or installations, PLC communications may be the best option for servicing communications, e.g., wireless communications incapable of penetrating walls or other structure, wireless communications deemed too insecure, installing wiring for other communication types is too expensive, etc. However, in other structures, WLANs, for example may be easier to install and service. For example, many coffee shops, restaurants, hotels, and other retail establishments use WLANs to service their customers.

Unfortunately, it is difficult to regulate access to WLANs. While coffee shops and other retail businesses would like to provide WLAN Internet access to attract customers they don't want unauthorized users to steal Internet access via the WLAN. Heretofore, these establishments have either used subscription services that covered the cost of providing Internet access via the WLAN or provided password access to customers for gratuitous WLAN access. While the first solution puts off customers who desire to receive Internet access as a benefit of being a customer, the second solution is open to abuse by non-customers.

DETAILED DESCRIPTION

Figure 1:
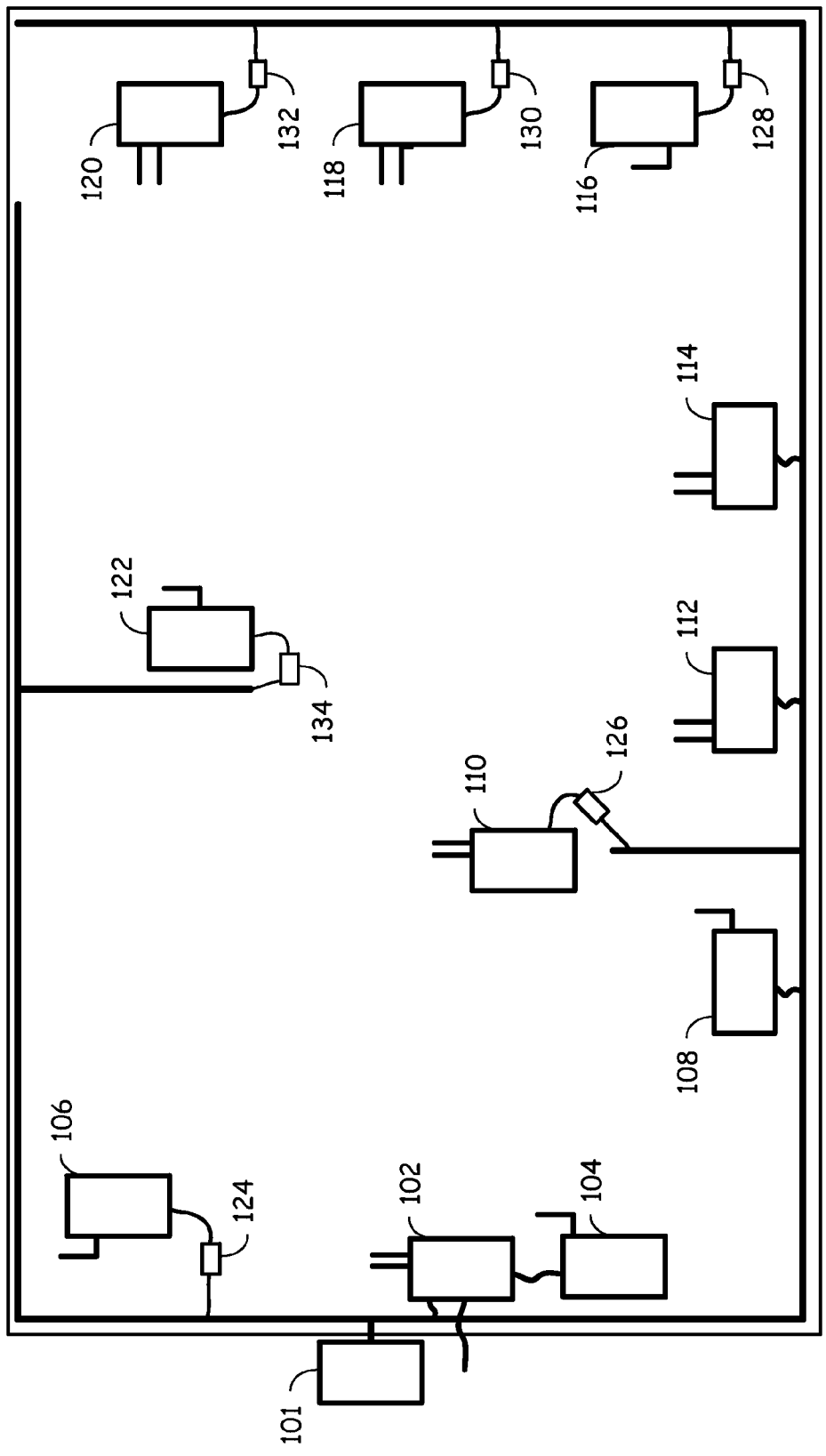
FIG. 1 is a system diagram illustrating a premises serviced by a Powerline Communication (PLC) device constructed according to one or more embodiments of the present invention.

FIG. 1 is a system diagram illustrating a premises serviced by a Powerline Communication (PLC) device constructed according to one or more embodiments of the present invention. Referring to FIG. 1, the premises 100 typically has a distributed mains wiring system (shown in heavy black line) consisting of one or more ring mains, several stubs and some distribution back to a junction box 101. In other constructs the distributed mains wiring system has a breaker box with circuits routed there from in a star configuration. With the example of FIG. 1, the premises is a coffee shop, book store, restaurant, or another retail establishment in which customers spend some time. The owner of the establishment derives income from customers that spend time in the establishment. Thus, the owner desires to provide Internet access to its customers.

Each of the customers receives Internet access via a Wireless Local Area Network (WLAN) setup by the premises owner. In the example illustrated, the owner maintains a WLAN access point that provides WLAN service within the premises and a router that supports Internet access. Generally, one or more devices maintained within the premises 100 provide Internet access. These one or more devices are referred to as a premises communication device. In the example of FIG. 1, the premises communication device may be a single device 102 that provides Internet access via an included WLAN access point and cable modem router. In another example, a first premises communication device includes a cable modem/DSL/WAN/Satellite communication system router 102 and a coupled WLAN access point 104.

A plurality of client devices 106, 108, 110, 112, 114, 116, 118, 120, and 122 are shown. The client devices 106-122 may be laptop computers, tablet computers, cell phones, WiFi phones, WiMAX phones, or other computing devices. Each of these devices 106-122 supports WLAN communications and is capable of receiving Internet access via the WLAN supported by the premises 100 owner/operator. Each of these client devices 106-122 is portable and accesses the power mains for power. In such case, the client devices may include power adapters or directly plug into the power mains. For example, each of client devices 108, 112, and 114 plugs directly into the power mains via a power cord while client devices 106, 110, 116, 118, 120, and 122 include power adapters 124, 126, 128, 130, 132, and 134, respectively. The power adapters 124, 126, 128, 130, 132, and 134 include power conversion circuitry that converts from the power mains AC voltage, e.g., 120 Volts, 240 Volts, etc. to a lower voltage, often DC voltage, that supplies power to the respective client device. An example of such a power adapter is illustrated in and described with reference to FIG. 2B.

According to the present invention, each of the client devices 106-122 supports PLC communications with the premises communication device 102. In particular, each of client devices 106-122 and/or their power adapters 124-134 includes PLC interface circuitry that supports PLC communications with the premises communication device 102, which also includes PLC interface circuitry. A PLC device is described with reference to FIG. 2A, which includes structures that may be present in one of the client devices 106-122, one of the adapters 124-134, and/or PLC device 102. References herein to PLC device are made either singularly or jointly to one or more of these devices/adapters. The functionality described herein for a PLC device may be provided by a client device in conjunction with a servicing power adapter.

Generally, the premises communication device 102 works in conjunction with the client devices 106-122 and their power adapters, if required, to exchange information via a supported PLC network. This information includes, in some embodiments, access data for a WLAN supported in the premises that is used to service Internet access for the client devices 106-122. The PLC network may be employed to deliver WLAN log in information (e.g., ID, password, WEP/WPA code) to a patron behind the scenes such that the wireless network attaches automatically. The PLC network may also support periodic key updating, may act as a secondary channel for advertising or streaming delivery, etc. The PLC network may also work in conjunction with the WLAN in a reverse manner such that the WLAN delivers PLC network information. These concepts may be extended beyond WLANs such that the PLC network is used to exchange privacy or other information for differing types of networks, e.g., WWAN networks, LANs, etc. Further, the PLC network may be used as a private channel or as an independent channel for key exchanges or to service financial transactions, such as purchases within the premises. In such case, sensitive financial data is not transferred via the WLAN, which may be snooped by other patrons.

Figure 2A:
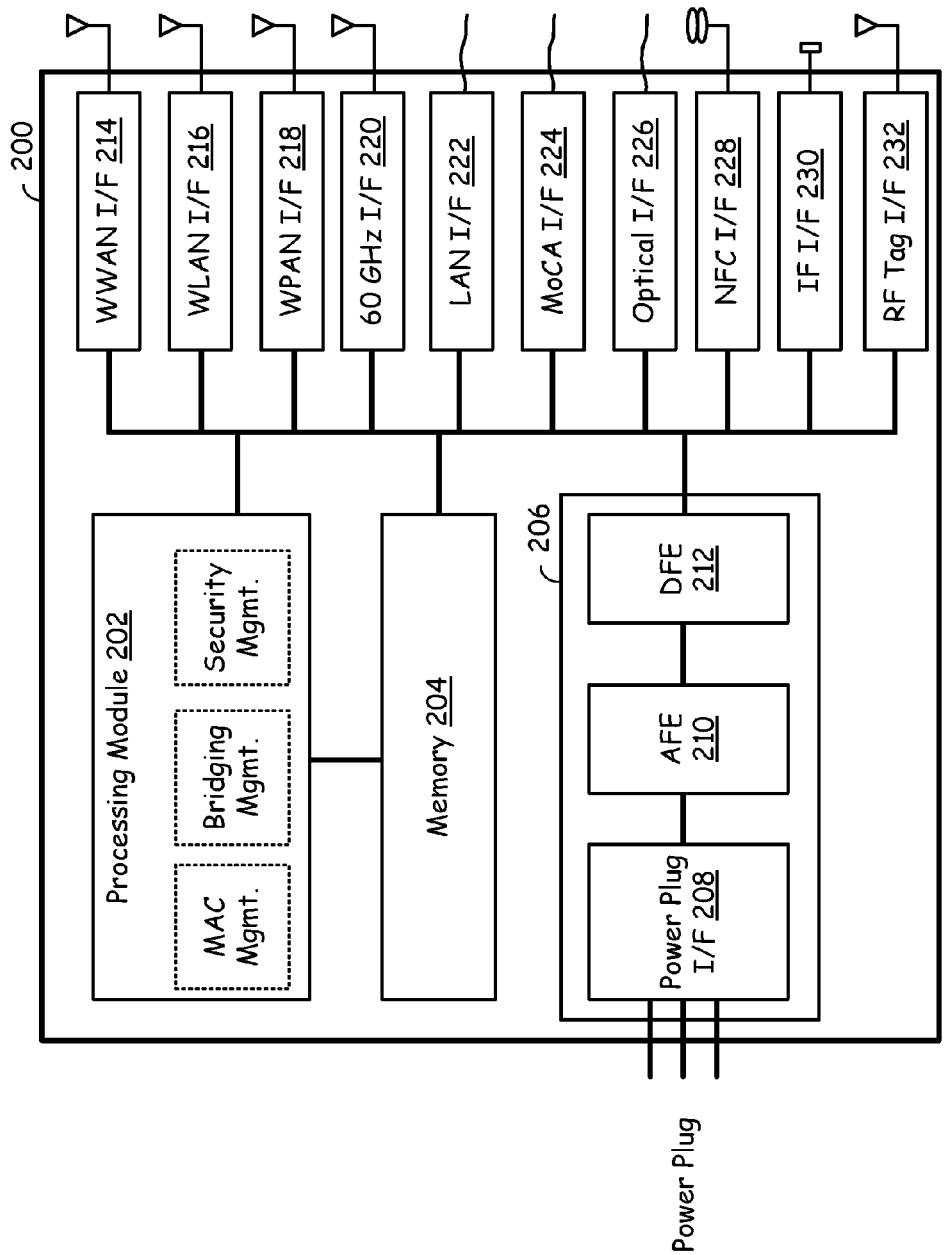
FIG. 2A is a block diagram illustrating a PLC device constructed according to one or more embodiments of the present invention.

FIG. 2A is a block diagram illustrating a PLC device constructed according to one or more embodiments of the present invention. The PLC device 200 supports PLC operations according to one or more PLC communication standards. The PLC device may embody some or all of one or more of the client devices 106-122 and/or the premises communication device 102/104 of FIG. 1. The PLC device 200 performs/supports the various operations described further herein according to one or more embodiments of the present invention. In various embodiments, the PLC device 200 is permanently installed within a premises, may be partially embodied in a power adapter, may be partially or fully embodied in a client device, or may be spread among multiple devices. In any case, the PLC 200 device supports at least PLC communications and may support other communications. As the reader will appreciate, both client devices and premises communication devices include some or all of the components of the PLC device 200.

The PLC device 200 includes a PLC interface 206 that includes a power plug interface 208, an Analog Front End (AFE) 210, and a Digital Front End (DFE) 212. Generally the AFE 210 includes analog signal processing elements while the DFE 212 includes digital signal processing elements. At least one Analog to Digital Converter (ADC) and at least one Digital to Analog Converter (DAC) service analog to digital and digital to analog signal conversion operations, respectively. Some of these PLC interface 206 components may be present in a power adapter, as will be further described with reference to FIG. 2B.

The PLC device 200 also includes one or more other communication interfaces, including a Wireless Wide Area Network (WWAN) interface 214, e.g., a WiMAX interface, a Wireless Local Area Network (WLAN) interface 216, e.g., an 802.11x interface, a Wireless Personal Area Network (WPAN) interface 218, e.g., a Bluetooth interface, a 60 GHz interface 220 (millimeter wave interface), a Local Area Network (LAN) interface 222, e.g., an Ethernet interface, a cable interface, e.g. Multimedia over Coax Alliance (MoCA) interface 224, an optical interface 226, a Near Field Communication (NFC) I/F 228, an Infra-Red I/F 230, and/or an RF Tag I/F 232. The user should appreciate that the PLC device 200 may bridge communications between a power plug and one or more devices, e.g., between the power plug and a desktop computer, a laptop computer, a touchpad computer, an appliance, a television, another entertainment system device, etc., via the PLC interface 206 and one or more of the other communication interfaces 214, 216, 218, 220, 222, 224, 226, 228, 230, and/or 232.

The processing module 202 may include one or more of a system processor, a digital signal processor, a processing module, dedicated hardware, an application specific integrated circuit (ASIC), or other circuitry that is capable of executing software instructions and for processing data. In particular, the processing module 202 is operable to support Medium Access Control (MAC) management, communications bridging management, and other management of the communications circuitry of the PLC device 200. The memory 204 may be RAM, ROM, FLASH RAM, FLASH ROM, optical memory, magnetic memory, or other types of memory that is capable of storing data and/or instructions and allowing processing module to access same. The processing module 202 and the memory 204 supports operations of embodiments of the present invention as further described herein, including MAC management, bridging management, and security management.

Figure 2B:
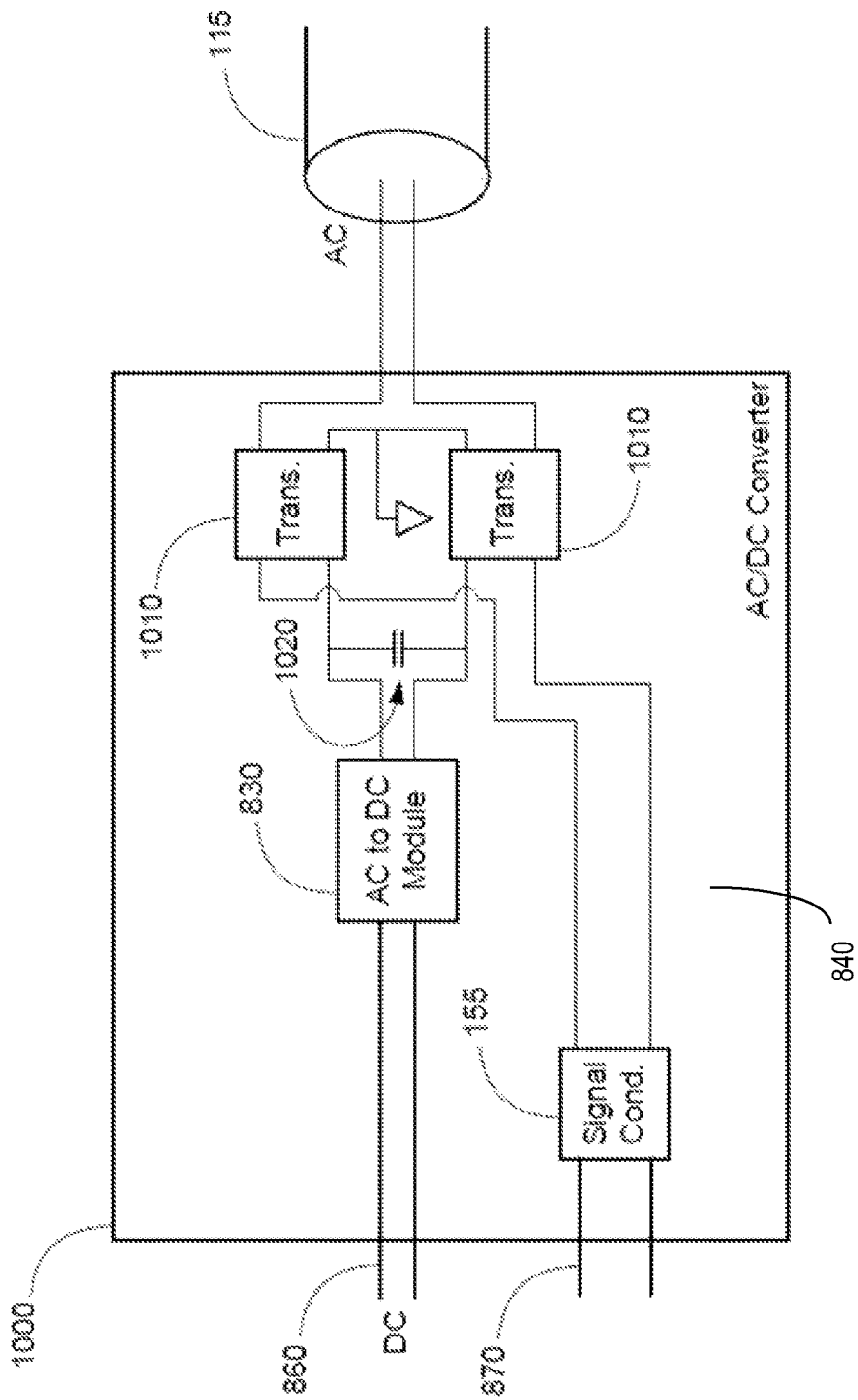
FIG. 2B illustrates a power adapter constructed according to, operating according to, and/or supporting one or more embodiments of the present invention.

FIG. 2B illustrates a power adapter constructed according to, operating according to, and/or supporting one or more embodiments of the present invention. The power adapter 1000 includes AC to DC module 830, signal coupling circuitry 840, and zero crossing circuitry (not shown). Signal coupling circuitry 840 is configured to send and receive digitally encoded signals between one or more conductors 870, coupled to client device, and the AC power mains 115. Signal coupling circuitry 840, in the illustrated example, includes a pair of transformers 1010 in parallel electrical communication between the power line 115 and a common ground as shown. The pair of transformers 1010 may be replaced by a single multi-tap transformer. Signal coupling circuitry 840 may include an entire communication interface or merely a part thereof with the remaining part of the communication interface embodied in a coupled client device.

AC to DC module 830 of the example illustrated by FIG. 2B receives AC line voltage from power line 115 through the pair of transformers 1010, as shown, and outputs one or more DC voltages on one or more conductors 860. A filter such as capacitor 1020 may be disposed between the pair of transformers 1010 and AC to DC module 830 to protect other components of power adapter 1000 from electrical noise generated by AC to DC module 830. Conductors 860 and 870 together can include cabling. Cabling can be integral with, or detachable from, power adapter 1000. Cabling can also terminate in a connector configured to mate with a corresponding receptacle on an appliance (not shown). Such a connector would have to be larger than a conventional two-wire DC power connection, and the resultant cable needs to be larger and stiffer than a two-wire cable. This is not desirable, and it would be preferable if a standard two wire output PSU with conventional connector could be used in the situations discussed above.

Figure 3A:
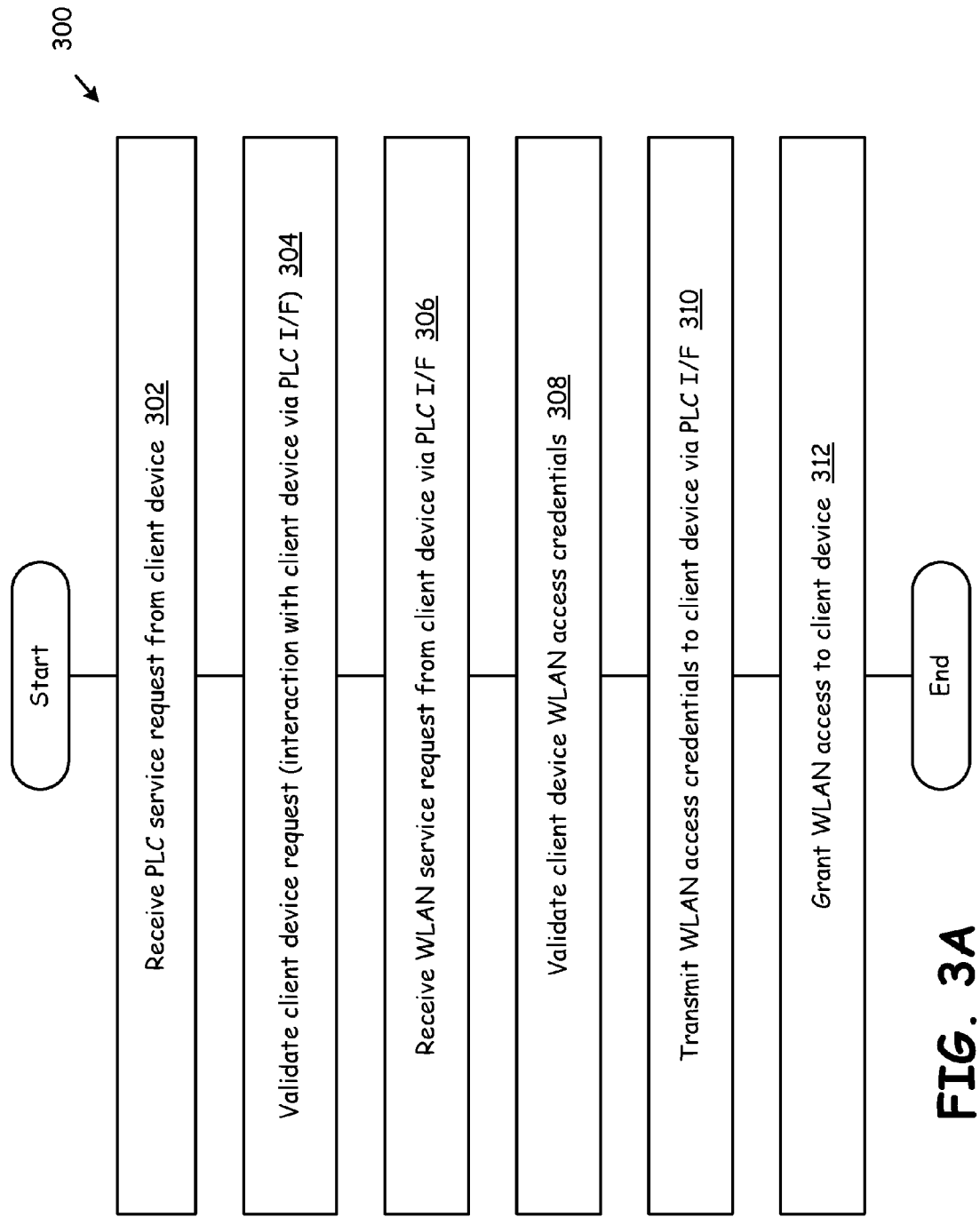
FIG. 3A is a flow chart illustrating operations of a premises operator PLC device according to one or more embodiments of the present invention.

FIG. 3A is a flow chart illustrating operations of a premises operator PLC device according to one or more embodiments of the present invention. The operations 300 described with reference to FIG. 3A are performed by a PLC device that serves as a premises communication device 102/104, such as illustrated in FIG. 1. In the operations described with reference to FIG. 3A, the premises communication device (PLC device) interacts with a client device, e.g., any of client devices 106-122, which may interface with the PLC device using a power adapter, e.g., 124-134.

Operations commence with the PLC device receiving a PLC service request from a client device via PLC media, e.g., power mains (Step 302). The PLC device then validates the PLC client device service request (Step 304). Validation at Step 304 will be described further with reference to FIG. 5. The PLC device then establishes validated communications with the client device via the PLC I/F.

The PLC device then receives a WLAN service request from the client device via the PLC I/F (Step 306). The PLC device then validates the client device for WLAN service (Step 308). Validation may be performed by looking to registration data for the client device, interacting with the client device to register the client device for service, obtaining credit card information for the client device, which relates to customer service history within the premises, or another validation operation.

Once the client device has been validated, the PLC device transmits WLAN access credentials to the client device via the PLC I/F (Step 310). The PLC device itself may provide the WLAN service within the premises. Alternately, the PLC device may interact with another security device and/or a WLAN access point to cause the WLAN access credentials to be registered with the WLAN access point. In response to a WLAN registration request, the client device is then granted WLAN access (Step 312).

With the operations 300 of FIG. 3, the PLC may download an executable program via the PLC I/F to the client device. The client device then loads and executes the executable program to allow it to interface with the PLC device. The executable program may be a Java script, a web page, or another executable program to allow registration and access credentials to be received.

Further, with the operations 300 of FIG. 3, the PLC device may periodically transmit updated WLAN access credentials to the client device via the PLC I/F. This allows the PLC device to more securely regulate access to the WLAN within the premises. Further, the PLC device may use the PLC network to transmit advertisements to the client device via the PLC I/F. These advertisements may relate to the products and services offered within the premises and also to other products and services, which are relevant to not only to the premises but to other related businesses, or simply products or services that are relevant to the business.

The PLC device may use the PLC network to service other transactions with the client device. Such transactions may include financial transactions as well as the transfer of privacy sensitive data to the client device. For example, the business owner of the premises may offer the streaming of video programming to paying customers, such streaming primarily serviced by the WLAN. For example, the business owner may desire to offer video programming to only a subset of customers and desire to preclude delivery of the video programming to others that may be able to access the WLAN. In such case, the PLC device may deliver one or more program keys or decryption codes to the client device via the PLC network, which the client device uses to access the video programming delivered via the WLAN. Of course, other content may also be protected in this manner.

Figure 3B:
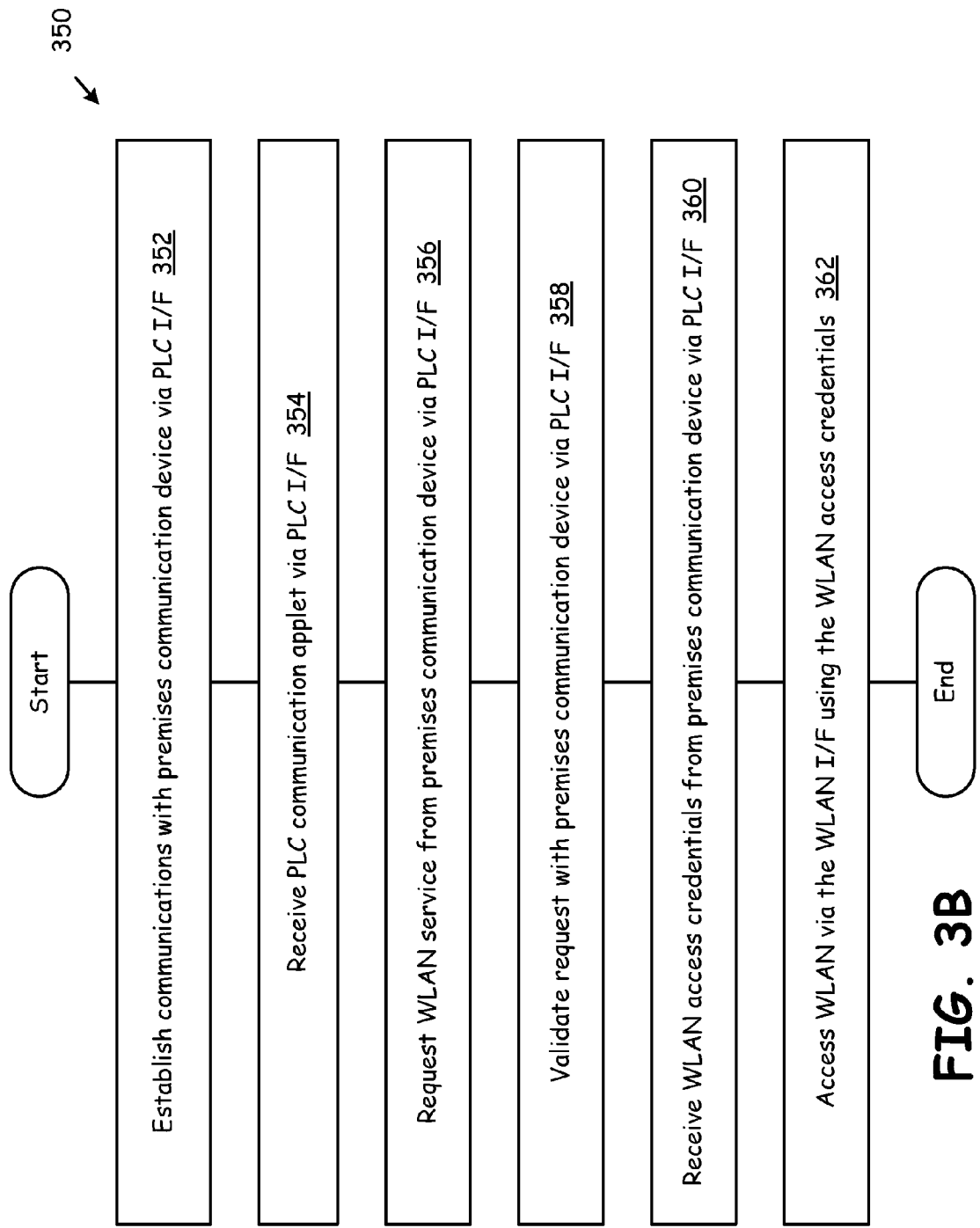
FIG. 3B is a flow chart illustrating operations of a client PLC device according to one or more embodiments of the present invention.

FIG. 3B is a flow chart illustrating operations of a client PLC device according to one or more embodiments of the present invention. Operations 350 commence with the client PLC device establishing communications with a premises communication device via its PLC I/F (Step 352). Operations may also include the client PLC device receiving a PLC communication applet (or other executable program) from the premises communication device (Step 354). Then, the client PLC device requests WLAN service from the premises communication device via the PLC I/F (Step 356). The premises PLC device and the client PLC device interface with one another so that the premises PLC device validates the WLAN service request (Step 358). The client PLC device then receives WLAN access credentials from the premises communication device via the PLC I/F (Step 360). Then, the client PLC device accesses a WLAN serviced by the premises operator via its WLAN I/F using the WLAN access credentials (Step 362).

The WLAN access credentials may include, for example, a WLAN system identifier, a password, an encryption type, and an encryption code. In some embodiments, all of all of establishing communication with a premises communication device via the PLC I/F, requesting WLAN service from the premises communication device via the PLC I/F, receiving WLAN access credentials from the premises communication device via the PLC I/F, and accessing the WLAN via the WLAN I/F using the access credentials occur without requiring user interface. In such case, the validation process is seamless to the user of the client device. Such validation process may be based upon prior interaction, registration data stored on the client device, or upon another process.

Figure 4:
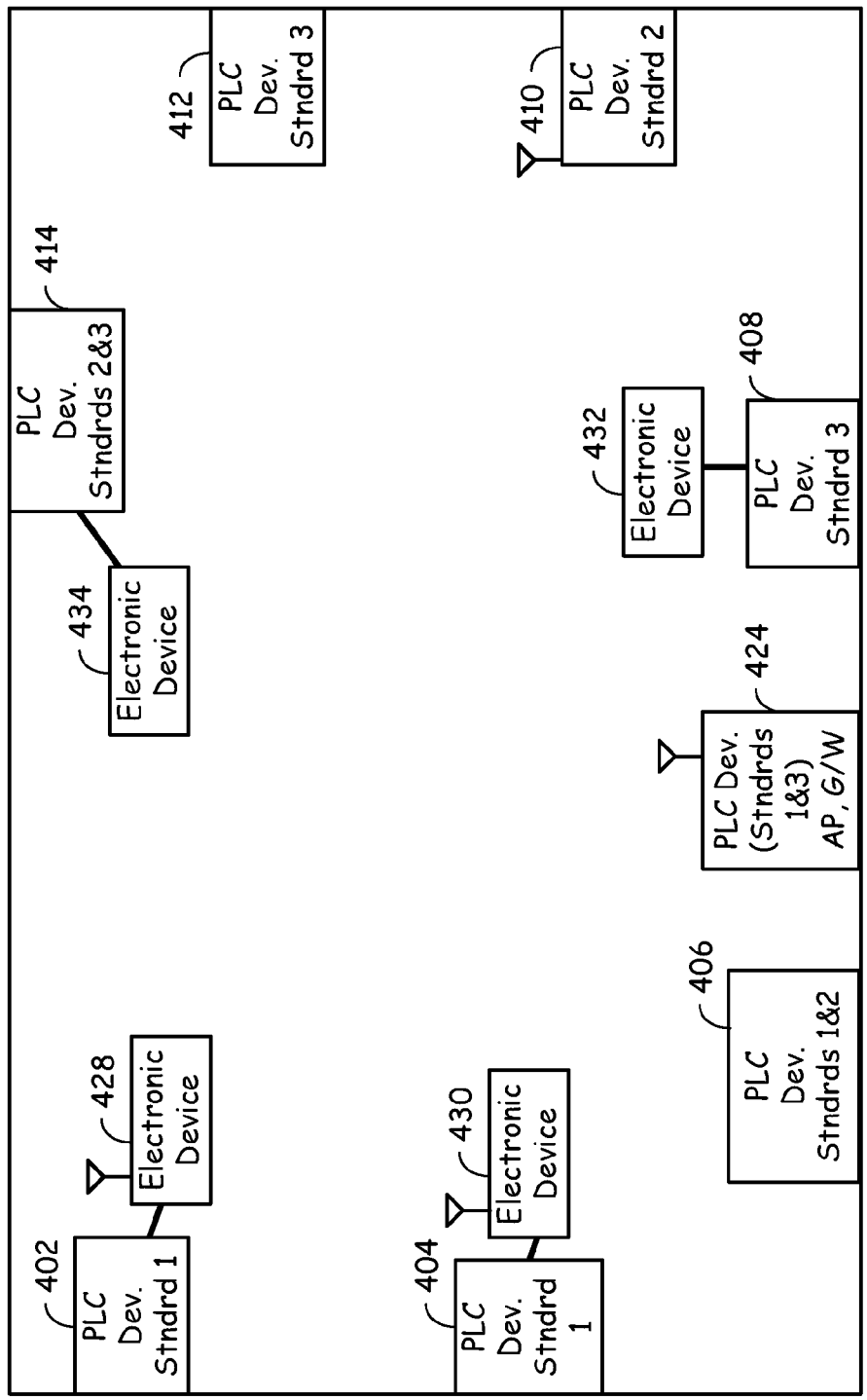
FIG. 4 is a system diagram illustrating a premises in which at least one PLC device resides that operates according to one or more embodiments of the present invention.

FIG. 4 is a block diagram illustrating a premises in which at least one PLC device resides that operates according to one or more embodiments of the present invention. The premises 400 may be a home, office building, apartment complex, hotel, industrial building, or another type of structure or the coffee shop previously described. In the particular example of FIG. 4, a WLAN access point 424 provides Internet access within the premises 400 and is also a PLC device constructed according to one or more embodiments of the present invention. Also shown within the premises 400 are a plurality of PLC devices 402, 404, 406, 408, 410, 412, and 414. One or more of these PLC devices 402, 404, 406, 408, 410, 412, and 414 may be provided by the premises 400 owner/operator while other of these PLC devices may be brought into the premises 400 by a customer. In particular, PLC device 402 services electronic device 428, PLC device 404 services device 430, PLC device 408 services electronic device 432, and PLC device 414 services electronic device 434. Each of these devices 428, 430, 432, and 434 may be owned by the premises 400 owner or may be owned by a premises 400 visitor. Each of the PLC devices operates according to aspects of the present invention to receive WLAN Internet access.

According to one or more other embodiments of the present invention, one or more of these PLC devices 402, 404, 406, 408, 410, 412, 414, and 424 supports one or more differing PLC communication standards. For example PLC device 402 supports PLC communication standard 1, PLC device 404 supports PLC communication standard 1, PLC device 406 supports PLC communication standards 1 and 2, PLC device 408 supports PLC communication standard 3, PLC device 410 supports PLC communication standard 3, PLC device 412 supports PLC communication standard 3, and PLC device 414 supports PLC communication standards 2 and 3, and PLC device 424 supports PLC communication standards 1 and 3. As will be further described herein the differing PLC communication standards may be wideband, narrowband, consistent with one another, and/or inconsistent with one another.

Currently existing PLC communication standards include the HomePlug family of operations, including the 1.0, AV1.1, AV2, and GP operations, and the HD-PLC operations. Generally, the HomePlug family of PLC communication standards is incompatible with the HD-PLC communication standard. The HomePlug PLC communication standard is widely deployed while HD-PLC is primarily deployed in Japan.

The IEEE 1901 specification includes a newer PLC communication standard that has two different PHY layers, one based on OFDM modulation (interoperable with HomePlug AV1.1), and another based on Wavelet modulation (interoperable with HD-PLC). Each PHY layer is optional, and implementers of the communication standard may, but are not required to include both. Devices that use the OFDM PHY only would not interoperate with devices based on the Wavelet PHY. The OFDM PHY is derived from HomePlug AV.

The IEEE 1905.1 specification defines an abstraction layer for multiple home networking technologies. IEEE 1905.1 provides a common data and control Service Access Point to the heterogeneous home networking technologies described in the following specifications: IEEE 1901, IEEE 802.11x, IEEE 802.3x and Multimedia over Coax Alliance (MoCA) 1.1. The IEEE 1905.1 standard is extendable to work with other home networking technologies. The IEEE 1905.1 layer resides between the media access control and Internet Protocol layers. The 1905.1 abstraction layer intends to make it easier to install and manage hybrid home networks and will also provide mechanisms for bridging data among different interfaces, i.e., plug and play.

ITU's G.hn specification is a competing counterpart to IEEE 1901 that primarily defines different ways to implement PHY and MAC layers of a PLC device. G.hn is a technology standard that enables service providers, consumer electronics companies, PC makers, and consumers to connect all types of devices via any wire in the home—coax cable, phone lines and powerlines.

There are a multitude of narrow and broadband PLC technologies beyond IEEE 1901 that already exist. For example, conventional tier two coexistence mechanisms are included in ISO/IEC 14908, G3 & G3 Lite, HP C&C, ISO/IEC 14543 which employ some form of CSMA/CA. Other PLC communication standard technologies do not support any type of coexistence other than tier one. Such standards include most current broadband PLC offerings, UPB, A10, INSTEON/X-10, Ariane Controls, CEBus, CEA 600.31, TDA 4051A, etc.

According to one or more embodiments of the present invention, one or more of the PLC devices 402, 404, 406, 408, 410, 412, 414, and 424 may serve as masters of the powerline media servicing the premises 400, may bridge communications across differing PLC communication standards, and/or may bridge communications between PLC communications and non-PLC communications. In some embodiments, each PLC standard will have a unique master, with differing PLC devices serving as masters for differing PLC communication standards. Likewise, each supported non-PLC communication standard may have its own master.

According to one or more embodiments of the present invention, one or more of the PLC devices 402, 404, 406, 408, 410, 412, 414, and 424 may serve as masters of the powerline media servicing the premises 400, may bridge communications across differing PLC communication standards, and/or may bridge communications between PLC communications and non-PLC communications. Several of these operations will be described herein subsequently. In some embodiments, each PLC standard will have a unique master, with differing PLC devices serving as masters for differing PLC communication standards. Likewise, each supported non-PLC communication standard may have its own master.

Figure 5:
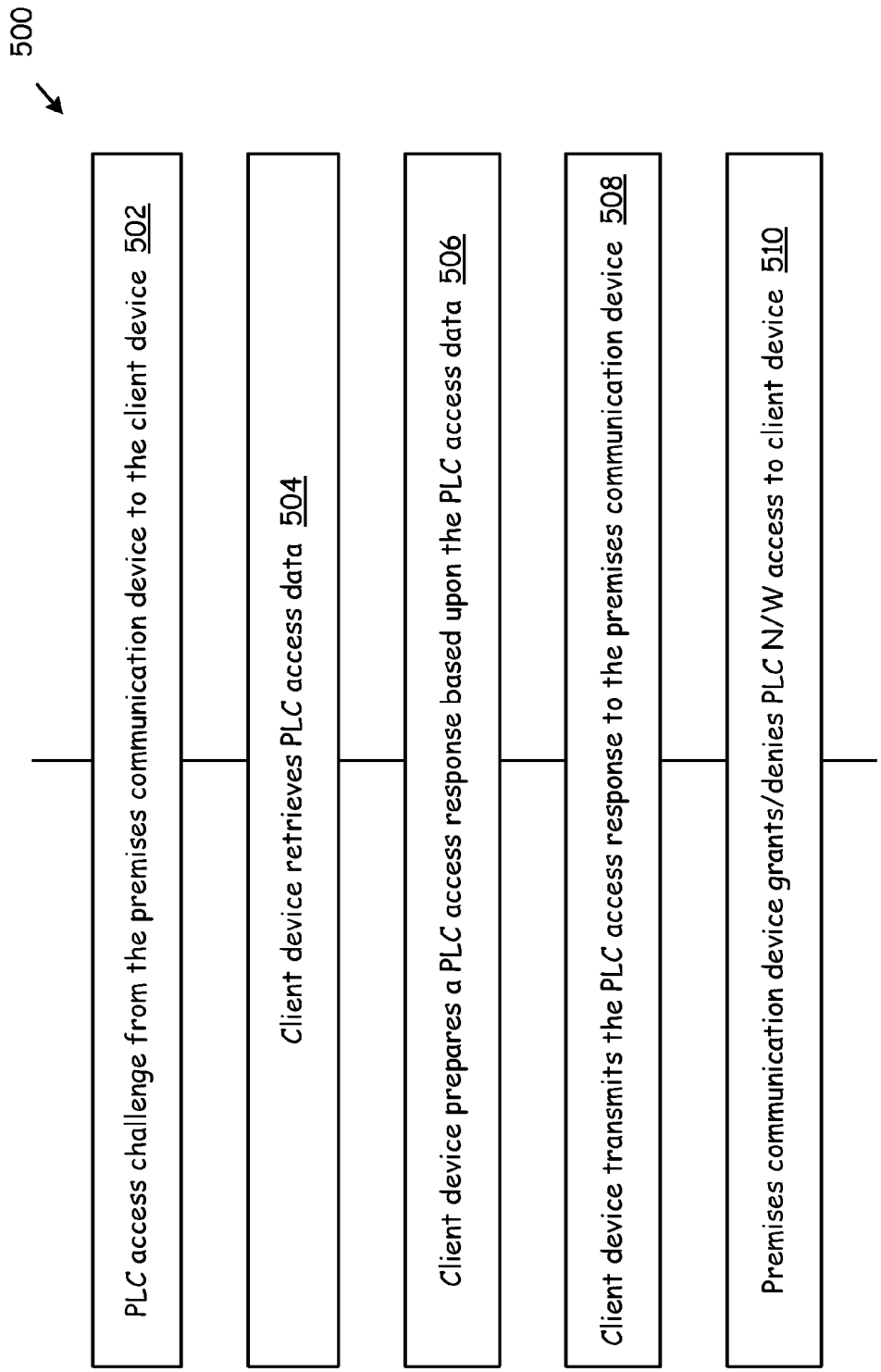
FIG. 5 is a flowchart illustrating operations according to one or more embodiments of the present invention for granting access to a PLC network.

FIG. 5 is a flowchart illustrating operations according to one or more embodiments of the present invention for granting access to a PLC network. Operations 500 commence with the client PLC device receiving a PLC access challenge from the premises communication device via its PLC I/F (Step 502). The client PLC device then retrieves PLC access data (Step 504). The client PLC device then prepares a PLC access response based upon the PLC access data (Step 506). The client PLC device then transmits the PLC access response via the PLC I/F (Step 508). Finally, the client PLC device is granted or denied access to the PLC network by the premises PLC device (Step 510).

At step 504, in retrieving the PLC access data, the client PLC device may retrieve the PLC access data from memory or based upon user input. In its operations in initially accessing the PLC network, the client device may first download an executable program via the PLC I/F from the premises PLC device. The client PLC device then executes the program to access the premises communication device via the PLC I/F to request WLAN service from the premises communication device to receive the WLAN access credentials. The executable program may be in the form of a web page, an applet, or another interface that may support user registration with in the premises.

Figure 6:
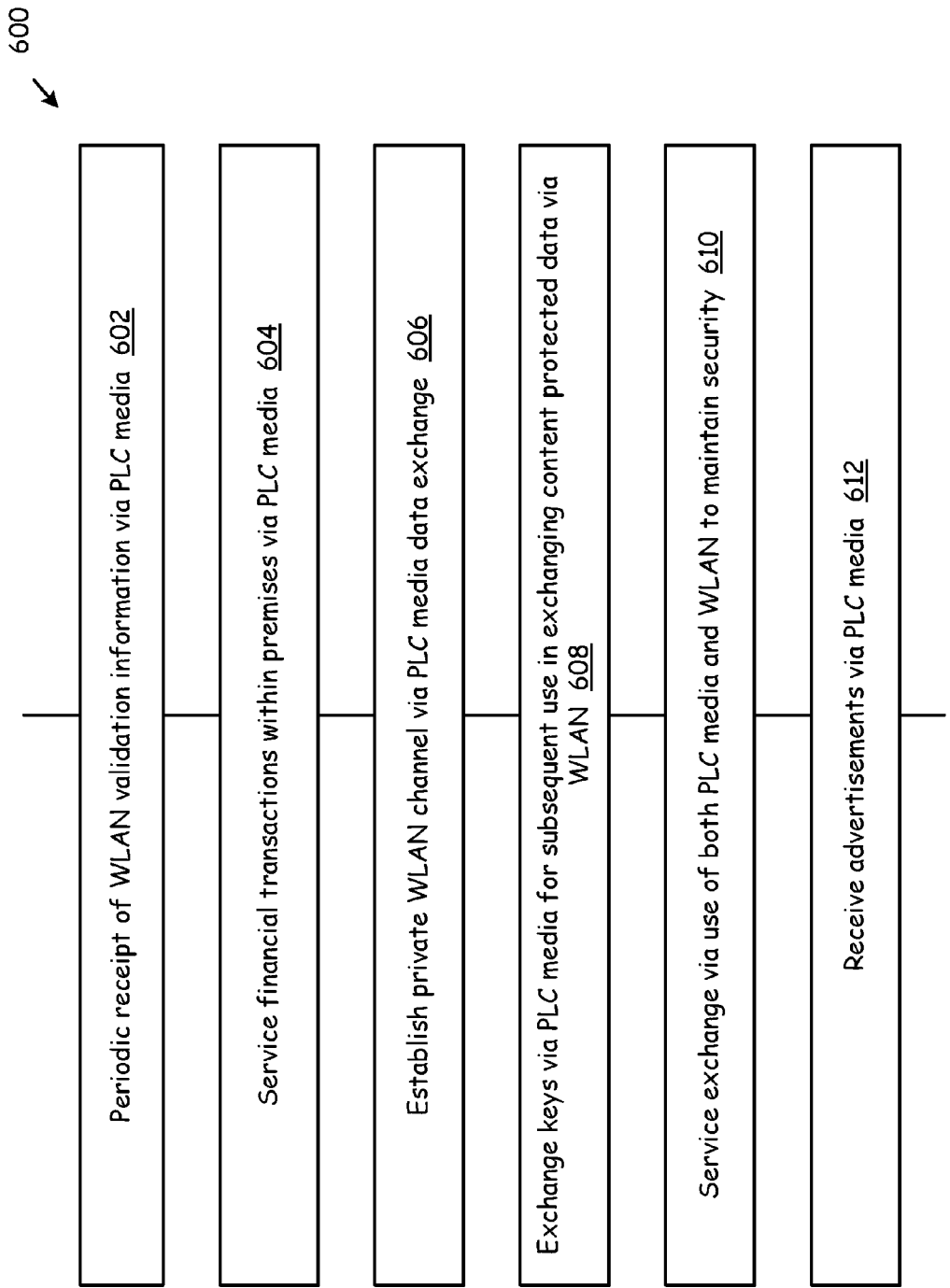
FIG. 6 is a flowchart illustrating various other operations according to one or more additional embodiments of the present invention.

FIG. 6 is a flowchart illustrating various other operations according to one or more additional embodiments of the present invention. Operations 600 of FIG. are performed optionally in addition to the other operations described herein. These operations 600 include periodically receiving additional/other WLAN validation information from the premises PLC device via the PLC interface (Step 602). Further, operations 600 may include servicing one or more financial transaction via the PLC interface and PLC media (Step 604). Operations may also include establishing a private WLAN channel using the PLC media to exchange information allowing the WLAN channel to be made private (Step 606). Further, the PLC media may be employed to exchange keys for subsequent use in exchanging content protected data via the WLAN (Step 608). Moreover, operations 600 may include servicing an exchange using both the PLC media and the WLAN to maintain security of the exchange (Step 610). Finally, operations may include transmitting advertisements and/or servicing financial transactions via the PLC media (Step 612).

Figure 7:
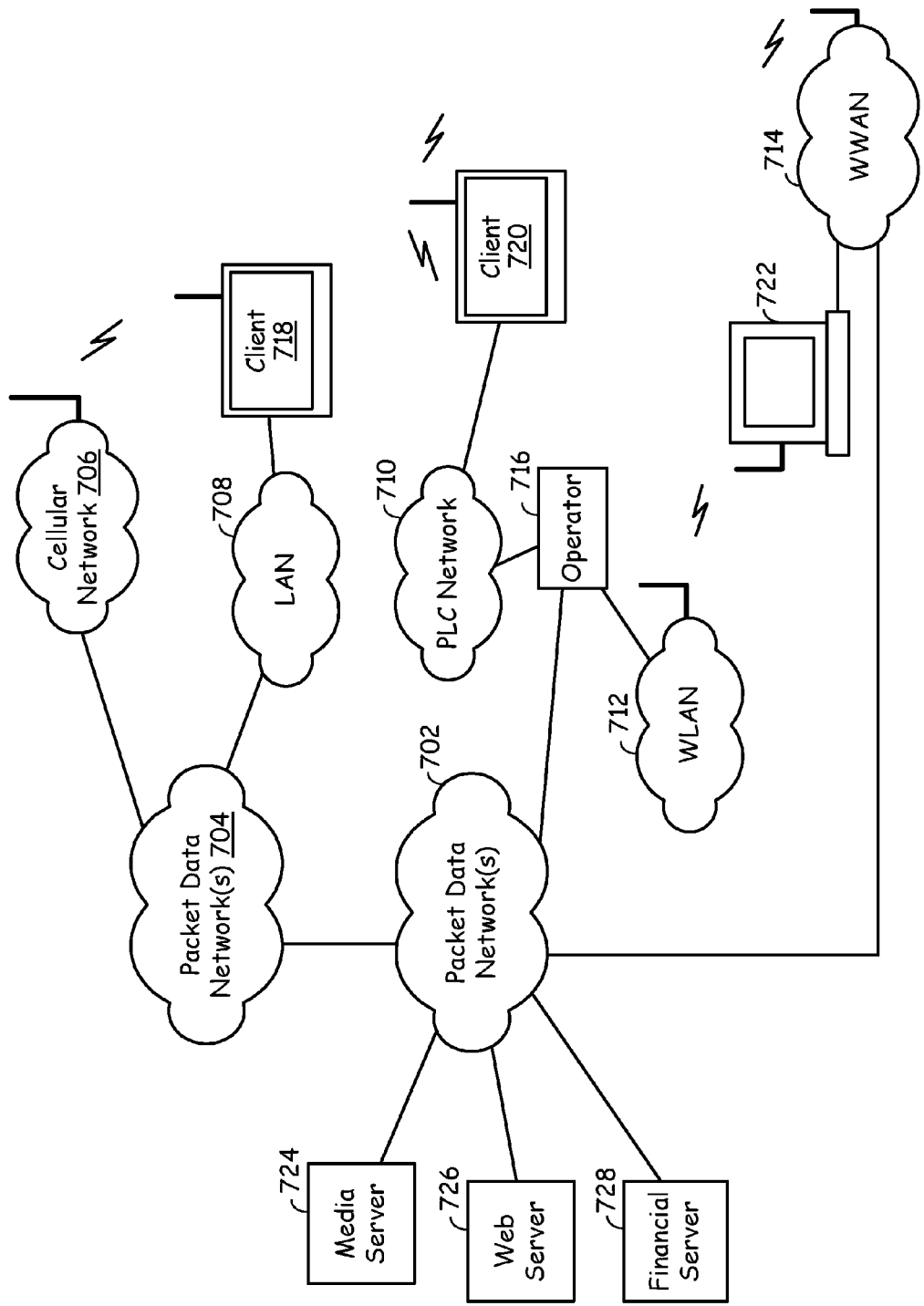
FIG. 7 is a diagram illustrating a network and a plurality of devices that operate according to one or more aspects of the present invention in servicing communications.

FIG. 7 is a diagram illustrating a network and a plurality of devices that operate according to one or more aspects of the present invention in servicing communications. The network includes a plurality of communication networks including packet data networks 702 and 704, which may form a portion of the Internet, the World Wide Web, or a combination thereof. The networks further include a cellular network 706, a LAN 708, a PLC network 710, a WLAN 712, and a WAN 714. These networks service client devices 718, 720, and 722, and may support various other client devices as well. An operator server 716 couples to PLC network 710 and WLAN 712, and indirectly couples to the other networks illustrated. The operator server 716 may service a business such as a coffee shop, a restaurant, an apartment complex, or another business. Media sever 724, web server 726, and financial server 728 couple to packet data network 702 and are operable to support corresponding transactions with one or more of client devices 718, 720, and/or 722. The operator server 716 may be incorporated with a PLC interface and a WLAN interface, as was previously described with reference to FIG. 2.

According to various embodiments of the present invention, multiple communication paths are employed to service communications between devices, e.g., between financial server 728 and client device 722, between web server 726 and client device 720, and/or between media server 724 and client device 718. In one particular embodiment, the network of FIG. 7 services a Multi-Tenant Housing complex or Office Space using both PLC communications via PLC network 710 and a wireless path, e.g., cellular network 706, WLAN 712, and/or WWAN 714.

According to one aspect of the present invention, PLC communications are used in conjunction with other communications such that alternate communication pathways are used to service transactions, i.e., one network used for some things and the other network used for other things, e.g., establishing communication services, utility management services, financial data exchanges, establishing passwords, establishing account information, and/or splitting data types and/or other services wherein secure communications are required. In such case, the communications are portioned across multiple transmission paths using half-duplex splitting or dual full duplex splitting, with intelligent bonded splitting and stitching. These operations may be serviced in the background such that they are unknown to a serviced application, driver, or user. The software that services these operations may be controlled by a user or controlled by a server of the transaction. Splitting of data may be based on data type, QoS, security variations found in underlying exchange data, or upon other criteria. Cross channel coding (e.g., redundancy), cross channel encryption, cross channel protocol division (e.g., ACK/NACK and data pathways), may also be serviced using the multiple communication paths.

For example, in a multi-tenant building, access to a PLC network may be limited based upon password security. In such case, the PLC network password security may be serviced using secure WLAN, a WWAN, or cellular communications. Of course, the complement to these operations is the use of a secure wireless network to transfer password login/access information for the PLC network.

In a sales transaction between financial server 728 and client device 718, for example, the credit card information transmitted from the client device 718 to the financial server may be divided up between a wireless link with the cellular network and a wired link to the LAN 708. By dividing up the financial transaction the possibility of theft of this information is reduced.

With the network of FIG. 7, either the client or the server (which could also be point to point server to server or client to client) may control the middling portion (routing backbone) selection as well to further minimize the chance for middling snoopers to be able to penetrate underlying security. For example, some pathways (port selections) flow through a first backbone routing network while other pathways flow through another routing network.

The PLC device 200 of FIG. 2 is operable to service the operations described with reference to FIG. 7. In such case, the PLC device 200 includes one or more interfaces to access the Internet, a PLC interface, and one or more wireless interfaces to service the client devices. In such case, the PLC device 200 may include multiple drivers and application software operable to service splitting communications among multiple interfaces. The Internet access may be performed by cable modem communications, cellular GSM LTE communications, and/or WiMAX communications, for example, with the PLC device 200 selectively using multiple interfaces to service the communications.

The PLC device operates as a PLC hub with integrated WLAN circuitry, for example, with the processing module 202 operable to solely make communication splitting decisions, which include both splitting upstream communications via the Internet backbone and one or more Internet communication pathways, and downstream communications via one or more of PLC interface and wireless interfaces. In any operation, the PLC device 200 is capable of initiating and/or servicing secure communications between a serviced client device and another remote device.

Figure 8:
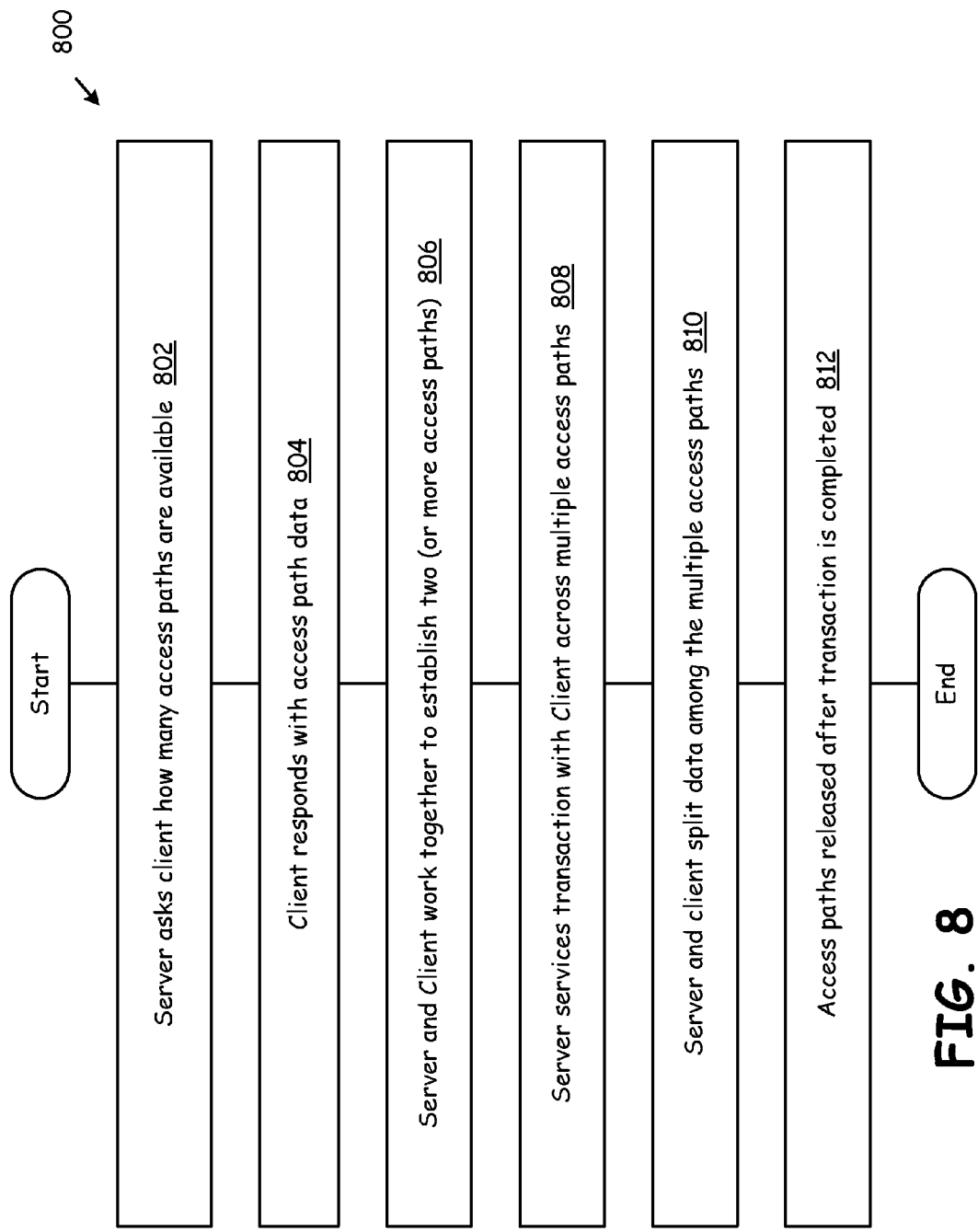
FIG. 8 is a flowchart illustrating operations according to one or more embodiments of the present invention for servicing communications.

FIG. 8 is a flowchart illustrating operations according to one or more embodiments of the present invention for servicing communications. The operations 700 of FIG. 8 consider a server providing credit card or account information to a client that must be serviced via SSL. In such case, the server first asks client device if more than one access means is available, e.g., multiple transmission paths available (Step 802). In response, the client notifies the server of how many and what type of access paths are available (Step 804). The server and client then activate two or more access paths, as are required to service the transaction (Step 806).

Then, the Server actively coordinates a log in, account information, sales transaction data, and/or other secure operations and information exchange across the multiple access paths (Step 808). The server and client communicate with one another across the multiple access paths, splitting data across the multiple paths as agreed (Step 810). In doing so, each of the Server and Client are required to split data prior to transmission and to stitch data together that are received via the multiple access paths. For each, a server to client flow uses the server port1 and the client portA, the server port1 to the client portB, the server port to the client portA, and the server port 2 to client portB (n times N) pathways across which a single secure exchange could take place. This extends to point to point (client to client or server to server) as well. After the transaction is completed, the multiple (or some of the) access paths are released (Step 812). From step 812, operation ends.

Circuitry described herein that performs particular functions may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions, which may be considered singularly or in combination a "processing module." The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the FIGs. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention.

The invention claimed is:

1. A Power Line Communications (PLC) device comprising:
    a processing module;
    memory coupled to the processing module;
    a Wireless Local Area Network interface (WLAN I/F) coupled to the processing module; and
    a PLC communication interface (PLC I/F) coupled to the processing module, the PLC I/F, WLAN I/F, and the processing module to:
        automatically download an executable program via the PLC I/F upon the PLC device being plugged into to a power line, and to load and execute the executable program in response thereto to establish communications with a premises communication device via the PLC I/F;
        request WLAN service from the premises communication device via the PLC I/F;
        receive WLAN access credentials from the premises communication device via the PLC I/F; and
        access a WLAN via the WLAN I/F using the WLAN access credentials.

2. The PLC device of claim 1, wherein the processing module, the PLC I/F, and the memory are operable to:

receive a PLC access challenge from the premises communication device via the PLC I/F;
retrieve PLC access data;
prepare a PLC access response based upon the PLC access data; and
transmit the PLC access response via the PLC I/F.

3. The PLC device of claim 2, wherein in retrieving the PLC access data, the processing module is operable to retrieve the PLC access data from the memory.

4. The PLC device of claim 1, wherein the WLAN access credentials comprise one or more of:
a WLAN system identifier;
a password;
an encryption type; and
an encryption code.

5. The PLC device of claim 1, wherein all of establishing communication with a premises communication device via the PLC I/F, requesting WLAN service from the premises communication device via the PLC I/F, receiving WLAN access credentials from the premises communication device via the PLC I/F, and accessing the WLAN via the WLAN I/F using the access credentials occur without requiring user interface.

6. The PLC device of claim 1, wherein the processing module is further operable to:
periodically receive updated WLAN access credentials from the premises communication device via the PLC I/F; and
enact the updated WLAN access credentials to access the WLAN.

7. The PLC device of claim 1, wherein the processing module is further operable to receive advertisements from the premises communication device via the PLC I/F.

8. The PLC device of claim 1, wherein the processing module is further operable to service financial transactions with the premises communication device via the PLC I/F.

9. A Power Line Communications (PLC) device comprising:
memory coupled to the processing module;
a PLC communication interface (PLC I/F)
a processing module coupled to the memory and to the PLC I/F, the processing module to:
automatically download an executable program via the PLC I/F upon the PLC device being plugged into to a power line, and to load and execute the executable program in response thereto to establish communications with a client device via the PLC I/F;
receive a WLAN service request from the client device via the PLC I/F;
validate the client device for WLAN service;
transmit WLAN access credentials to the client device via the PLC I/F.

10. The PLC device of claim 9, wherein the processing module is further operable to:
receive a PLC service request from the client device via the PLC I/F;
transmit a PLC access challenge to the client device via the PLC I/F; and
receive a PLC access response based upon the PLC access challenge via the PLC I/F.

11. The PLC device of claim 9, wherein the WLAN access credentials comprise one or more of:
a WLAN system identifier;
a password;
an encryption type; and
an encryption code.

12. The PLC device of claim 9, wherein the processing module is further operable to periodically transmit updated WLAN access credentials to the client device via the PLC I/F.

13. The PLC device of claim 9, wherein the processing module is further operable to transmit advertisements to the client device via the PLC I/F.

14. The PLC device of claim 9, wherein the processing module is further operable to service financial transactions with the client device via the PLC I/F.

15. A method of operating a Power Line Communications (PLC) device comprising:
automatically downloading an executable program via the PLC I/F upon the PLC device being plugged into to a power line, and loading and executing the executable program in response thereto to establish communications with a client device via a PLC I/F;
receiving a WLAN service request from the client device via the PLC I/F;
validating the client device for WLAN service; and
transmitting WLAN access credentials to the client device via the PLC I/F.

16. The method of claim 15, further comprising:
receiving a PLC service request from the client device via the PLC I/F;
transmitting a PLC access challenge to the client device via the PLC I/F; and
receiving a PLC access response based upon the PLC access challenge via the PLC I/F.

17. The method of claim 15, wherein the WLAN access credentials comprise one or more of:
a WLAN system identifier;
a password;
an encryption type; and
an encryption code.

18. The method of claim 15, further comprising periodically transmitting updated WLAN access credentials to the client device via the PLC I/F.

19. The method of claim 15, further comprising servicing financial transactions with the client device via the PLC I/F.

* * * * *

UNITED STATES PATENT AND TRADEMARK OFFICE
CERTIFICATE OF CORRECTION

PATENT NO.        : 8,745,704 B2  
APPLICATION NO.   : 13/324084  
DATED             : June 3, 2014  
INVENTOR(S)       : James D. Bennett Page 1 of 1

It is certified that error appears in the above-identified patent and that said Letters Patent is hereby corrected as shown below:

In the Claims

Col. 12, line 55, in claim 1: after "plugged into" delete "to"  
Col. 13, line 40, in claim 9: after "interface (PLC I/F)" insert --;--  
Col. 13, line 44, in claim 9: after "being plugged into" delete "to"  
Col. 14, line 24, in claim 15: after "plugged into" delete "to"

Signed and Sealed this  
Seventeenth Day of March, 2015

Michelle K. Lee  
*Director of the United States Patent and Trademark Office*